(No Model.) 2 Sheets—Sheet 1.
G. JOHNSON.
HAY PRESS.
No. 330,982. Patented Nov. 24, 1885.
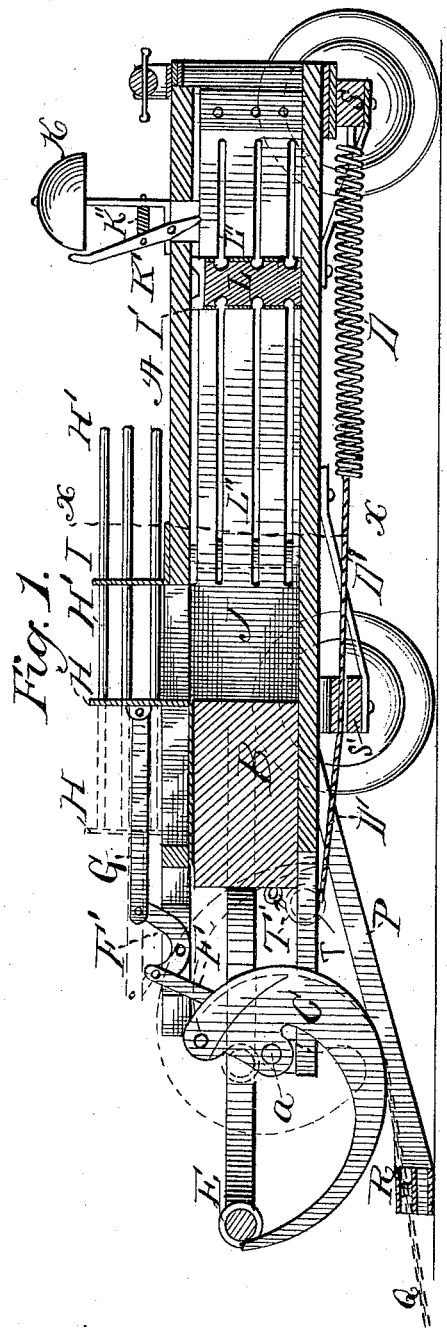
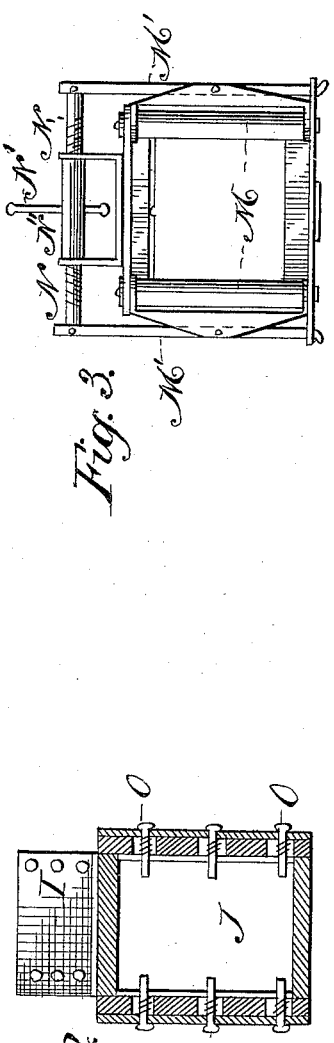
Witnesses:
Inventor:
Gustaf Johnson
By L. Bingham
Attorney (No Model.) 2 Sheets—Sheet 2.
G. JOHNSON.
HAY PRESS.
No. 330,982. Patented Nov. 24, 1885.
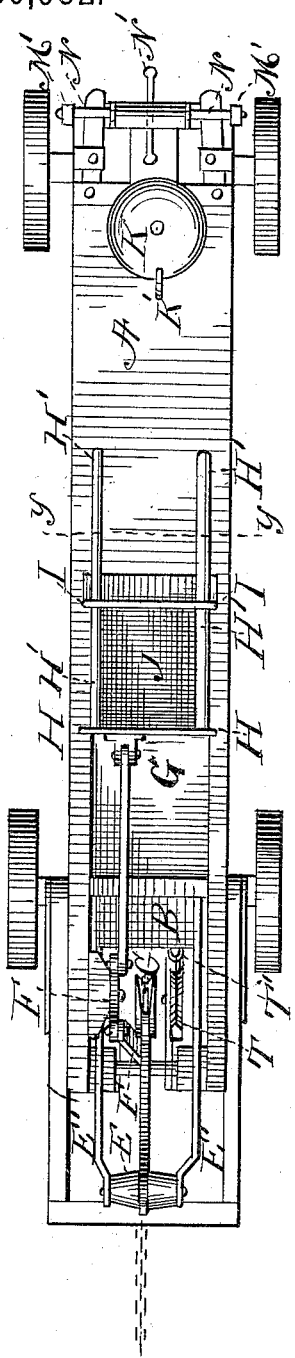
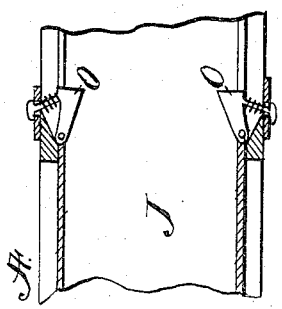

UNITED STATES PATENT OFFICE.

GUSTAF JOHNSON, OF DENVER, COLORADO.

HAY-PRESS.

SPECIFICATION forming part of Letters Patent No. 330,982, dated November 24, 1885.

Application filed August 4, 1885. Serial No. 173,515. (No model.)

*To all whom it may concern:*

Be it known that I, GUSTAF JOHNSON, of Denver, in the county of Arapahoe and State of Colorado, have invented certain new and useful Improvements in Hay-Presses; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object to provide an improved, simplified, and novel construction of portable hay-presses, whereby the operation of baling hay, straw, or other materials may be accomplished in the simplest and best possible manner, the construction being such that the material is readily fed into a hopper, compressed into the desired shape, and automatically ejected from the apparatus in a continuous series of bales, the bale in the course of formation serving to eject the completed bale preceding it; and my improvements consist, essentially, of a rectangular frame or compartment mounted upon vehicle-wheels, and provided with mechanism for feeding the hay, straw, or other material into the said frame or compartment, mechanism for compressing said material into a bale and ejecting it from said frame or compartment, and mechanism for automatically indicating the formation of each complete bale, all as will be hereinafter fully described, and pointed out in the claims.

In the accompanying drawings, Figure 1 represents a vertical longitudinal section of my improved apparatus, and Figs. 2 and 3 detail views thereof. Fig. 4 is a top plan view of the same, and Fig. 5 is a detail view thereof.

Similar letters of reference occurring on the several figures indicate corresponding parts.

Referring to the drawings, A represents the rectangular frame or compartment, mounted upon the vehicle-wheels and provided with suitable traction appliances for moving it from one place to another.

B represents the compressing head or plunger, arranged to horizontally move within the frame or compartment at one end, and which is adapted to be operated backward and forward by means of the crescent-shaped cam C, in connection with the spring D and intermediate cord, D', as shown in Fig. 1. The crescent-shaped cam-lever C is pivoted at *a* to the rear part of the frame or compartment A.

E is a roller having a central groove to accommodate the cam C in its oscillations. It is held in place by the rods E' E', attached to the sides of the plunger B.

F is a connecting-bar secured to the cam C slightly above *a*. It effects the synchronous movement of the bell-crank F', cam C, connecting-bar G, and sliding head H, whose horizontal oscillation is guided and regulated by rods H', passing through perforations in the rigid head I.

J is the space for introducing the hay to be compressed.

K is the bell, which indicates the completion of the baling operation. It is sounded by the lever K', which is pushed forward by the prongs L' on the sliding partition L, and brought back by the spring K''.

L'' are grooves in the frame to introduce the binding wire or cord.

M are rollers to grasp the finished bale. They are secured to movable frames M', which are reciprocated by the lever N', operated by hand, which actuates the drum N'', having interior right and left screw-threads to engage similar threads on the bars N N. The bale is expelled by the pushing action of the incipient succeeding bale.

O O are a series of bell-cranks serving to permit the passage forward of the hay, but preventing its return.

P is the draft-pole. Its cross-bar has two compartments, respectively, to accommodate the pulley R (which guides the chain Q) and to attach the draft appliances.

S S' are the axles. To the former the spring D is secured, and the cord D' passes through a hole in the latter.

T is the hook on the plunger B, by which the cord D' is connected therewith, and T' is the pulley which guides the cord. The hay being introduced in the space J, every reciprocation of the chain Q pushes the plunger B backward, whence it is returned by the spring D. The consecutive charges of hay, being thus compressed between the movable head L and plunger B, assume the shape of the surrounding walls. This shape is maintained by the passage of binding-wires through the spaces L″. The incipient succeeding bale will then push the completed bale and head L out between the rollers M, (the bell K being sounded intermediately.) The traveler or head L is then again inserted in the space J, so that one head is constantly inside the frame to serve as an abutting wall for the bay.

What I claim is—

1. The plunger B, actuated by cam C and chain Q, in combination with the frame E′ E′, the cam C, chain Q, pulley R, cord D′, pulley T, and spring D.

2. The plunger B, having frame E′ E′ secured thereto, in combination with the cam C, pulley R, chain Q, connecting-bars F G, bell-crank F′, sliding head H, having guiding-rods H′, rigid head I, travelers L, and rollers M, having mechanism, as shown, to adapt their distances from each other to the size of the bale.

In testimony that I claim the foregoing as my own I affix my signature in presence of two witnesses.

GUSTAF JOHNSON.

Witnesses:
CHAS. W. STOKES,
HIRAM WITTER.